(No Model.)　　　　　H. M. WHITNEY.　　　2 Sheets—Sheet 1.
SPRING VEHICLE.

No. 416,351.　　　　　　　　　Patented Dec. 3, 1889.

WITNESSES:　　　　　　　　　　　　　INVENTOR:
C. L. Bendixon　　　　　　　　　　　Henry M. Whitney
E. Laass　　　　　　　　　　　　　　BY
　　　　　　　　　　　　　　　　　Duell & Benedict
　　　　　　　　　　　　　　　　　his ATTORNEYS (No Model.) 2 Sheets—Sheet 2.
H. M. WHITNEY.
SPRING VEHICLE.
No. 416,351. Patented Dec. 3, 1889.
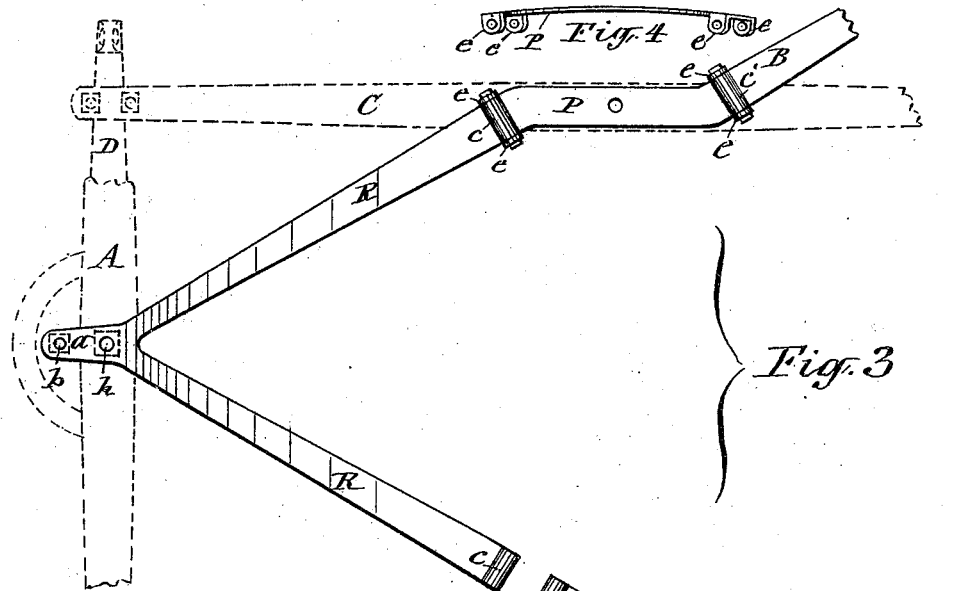
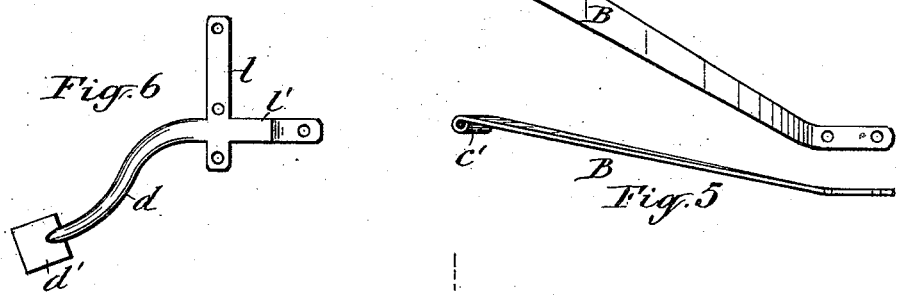
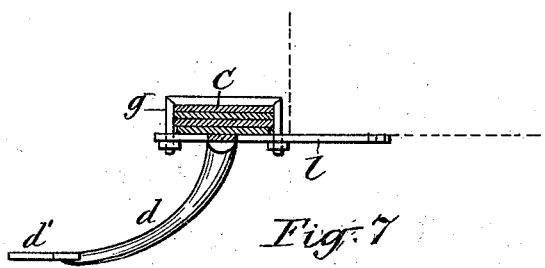
WITNESSES:
INVENTOR:
Henry M. Whitney
BY
his ATTORNEYS

UNITED STATES PATENT OFFICE.

HENRY M. WHITNEY, OF CORTLAND, NEW YORK.

SPRING-VEHICLE.

SPECIFICATION forming part of Letters Patent No. 416,351, dated December 3, 1889.

Application filed September 25, 1889. Serial No. 325,022. (No model.)

*To all whom it may concern:*

Be it known that I, HENRY M. WHITNEY, of Cortland, in the county of Cortland, in the State of New York, have invented new and useful Improvements in Spring-Vehicles, of which the following, taken in connection with the accompanying drawings, is a full, clear, and exact description.

This invention relates to side-spring vehicles, and particularly to that class in which the two axles are connected by reaches or braces extending diagonally from the end portions of the rear axle to the central portions of the side springs, to which they are connected, and extend thence to the front axle.

My present invention consists in an improved construction and combination of parts, as hereinafter fully described, and specifically set forth in the claims.

Figure 1:
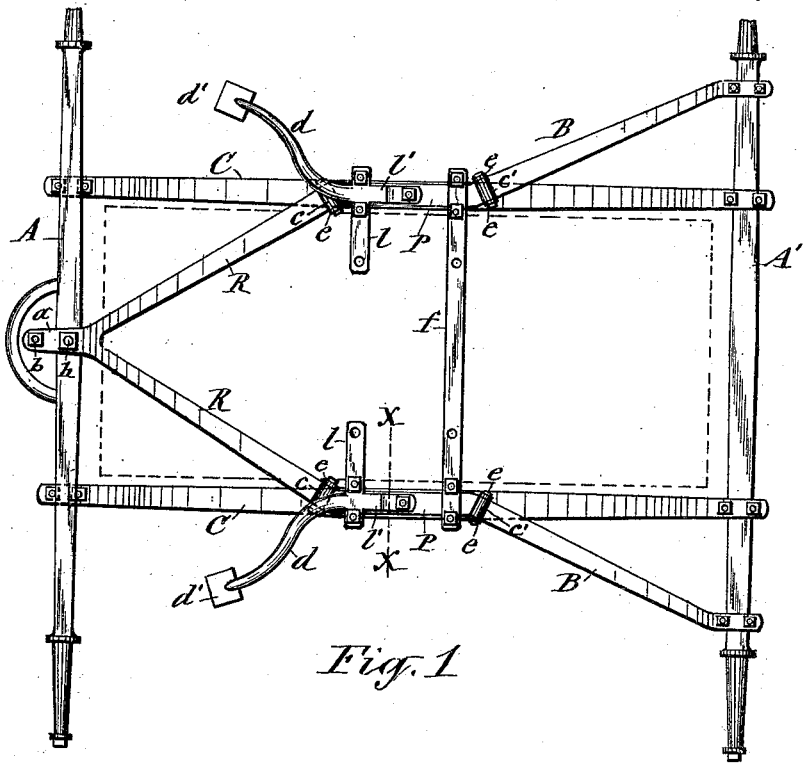
Figure 2:
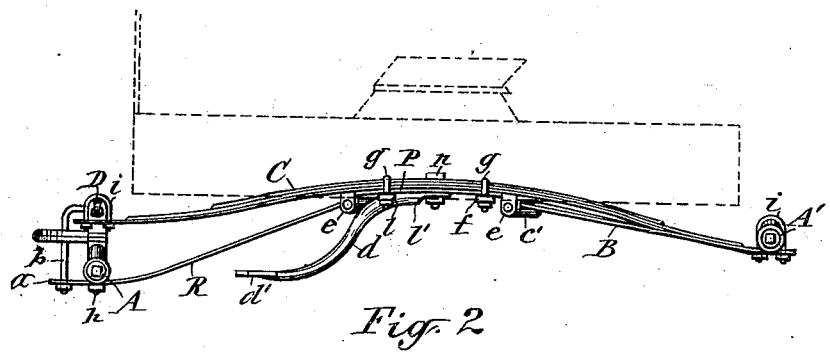

In the annexed drawings, Figure 1 is an inverted plan view of a spring-vehicle embodying my improvements. Fig. 2 is a side view of the same. Fig. 3 is an enlarged inverted plan view of the details of the reach-section and braces and their connections. Fig. 4 is an edge view of one of the plates by which the reach-section and braces are connected to the side springs. Fig. 5 is an edge view of one of said braces. Fig. 6 is an enlarged detached inverted plan view of one of the body-loops and step formed integral therewith; and Fig. 7 is an enlarged vertical transverse section on line $x\,x$, Fig. 1.

Similar letters of reference indicate corresponding parts.

A and A' represent, respectively, the front and rear axles of the vehicle, and D the head-block or spring-bar mounted on the front axle and connected thereto by the king-bolt $h$, passing through said parts.

C C denote the side springs, which are rigidly secured to the under side of the head-block and under side of the rear axle by two sets of clips $i\,i$, embracing, respectively, said head-block and axle. To the under side of the central portion of each side spring I rigidly attach a plate P, disposed parallel with the spring and terminating at the front end with an inward deflection and at the rear end with an outward deflection and with perforated downward-projecting ears $e\,e$ on each end. Said plates I secure to the side springs by means of a cross-bar $f$, extending with its ends across the under sides of the rear end portions of the plates and fastened thereto by clips $g\,g$, embracing the springs and plates. Across the other end portion of each plate P, I place a body-loop $l$, formed with a perforated rearwardly-extending shank $l'$, and fasten said body-loop to the plate by means of a clip $g$, embracing the spring and subjacent plate and passing with its limbs through perforations in the body-loop and provided with nuts on its ends, and a bolt $n$ passes through the perforation of the shank $l'$ and through the plate P and spring C, and is provided at one end with a head and at the opposite end with a nut. The leaves of the spring are thus firmly tied together, and the plate P rigidly secured to the spring by means of two clips and a bolt between said clips. The cross-bar $f$ ties the two springs to each other and braces the same laterally. The body of the vehicle is mounted on the said cross-bar and body-loops, which are perforated for the reception of bolts by which the body is fastened thereto.

The body-loops $l\,l$ being firmly sustained by the shanks $l'\,l'$, I utilize the same for supporting the steps $d'\,d'$ by forming the latter with arms $d\,d$, which are integral with the body-loops and extend forward and outward therefrom.

R represents a V-shaped reach section or brace, formed in one piece, preferably of flat spring-steel. Said reach-section I form with a tongue-extension $a$, which is extended across the under side of the front axle and is perforated under the center of the axle and in front of said axle. The king-bolt $h$ passes through one of the perforations and is provided with a nut on its protruding end, and a brace $b$ is rigidly attached to the front of the head-block and extended down through the perforation of the tongue-extension $a$ in front of the axle and provided with a nut on its lower end. By forming the said reach section or brace in one piece I obviate the liability of its rattling and render the same strong and durable, and by its connection with the king-bolt $h$ and brace $b$ the front axle is prevented from rocking, inasmuch as the said reach-section has the same elasticity as the side springs and vibrates with the same when the vehicle is loaded. The rear ends of the arms of the reach-brace R are each formed with a shackle-eye c, which is inserted between the ears e e on the front end of the plate P and hinged thereto by a bolt passing through said ears and intervening shackle-eye. By thus hinging the reach-section R to the side springs I obviate torsion of the latter when subjected to a load.

B B represent two braces, which are also formed of flat bars of spring-steel. These braces are each formed at one end with a shackle-eye c', which is inserted between the ears e e on the rear end of one of the plates P and hinged thereto by a bolt passing through the ears and intervening shackle-eye c'.

The rear ends of the braces B B extend across the under side of the end portions of the rear axle and are rigidly attached thereto by clips embracing the axle and passing with their limbs through the braces and provided with nuts on their ends. It will thus be observed that the two side springs and two braces B B are all rigidly secured to the under side of the rear axle, and this, being usually straight, brings the rear ends of said springs and braces all in one and the same horizontal plane and imparts to the vehicle a neat and compact appearance.

Having described my invention, what I claim as new, and desire to secure by Letters Patent, is—

1. In combination with the front and rear axles, side springs, and body, the plates P P, secured to the central portions of said springs and parallel therewith, the reach-sections R R, articulated to the front ends of said plates and extending convergently to the center of the front axle and connected thereto, and the braces B B, articulated to the rear ends of the aforesaid plates and extending divergently to the rear axle and connected thereto, substantially as described and shown.

2. In combination with the front axle, head-block, and side springs, the V-shaped reach-section R, formed in one piece and with the tongue-extension a at the junction of its arms, and lying with said extension under the front axle, the king-bolt passing through the tongue-extension a, the brace b, extending from the front of the head-block through the front end of said tongue-extension, and shackles hinging the rear ends of the said reach-section to the central portions of the side springs, substantially as described and shown.

3. In combination with the front axle and side springs, the V-shaped reach-section R, secured at the junction of its arms to the said axle and terminating with shackle-eyes c c at the central portions of the side springs, plates P P on the under sides of said springs and formed with perforated ears containing the aforesaid shackle-eyes, bolts coupling said eyes to the ears, body-loops l l, lying across the aforesaid plates and formed with perforated rearwardly-extending shanks l' l', clips embracing the springs and fastening the body-loops thereto, and bolts passing through the shanks l' l', plates P P, and springs, substantially as described and shown.

4. In combination with the two axles, head-block, and side springs, the plates P P on the under sides of the central portions of said springs, formed with perforated ears e e at both ends, the body-loops l l, and cross-bar f, lying across the under sides of said plates, clips g g, embracing the springs and fastening thereto the body-loops and cross-bar, the V-shaped reach-section R, formed in one piece, and with the tongue-extension a extending across the under side of the front axle and receiving the king-bolt through it, and the rear ends of said reach-section terminating with shackle-eyes c c and connected thereby to the front ears e e of the aforesaid plates, and the braces B B, formed at the front ends with shackles c' c' and connected thereby to the rear ears e e, and the rear ends of said braces secured to the under side of the end portions of the rear axle by clips embracing the latter, substantially as described and shown.

In testimony whereof I have hereunto signed my name this 23d day of September, 1889.

HENRY M. WHITNEY. [L. S.]

Witnesses:
J. E. EGGLESTON,
RUFUS T. PECK.